United States Patent
Wethern (10) Patent No.: US 8,989,947 B2
(45) Date of Patent: Mar. 24, 2015

(54) SONAR SYSTEM FOR REMOTE VEHICLE

(71) Applicant: iRobot Corporation, Bedford, MA (US)

(72) Inventor: Thomas James Wethern, Allston, MA (US)

(73) Assignee: iRobot Corporation, Bedford, MA (US)

( * ) Notice: Subject to any disclaimer, the term of this patent is extended or adjusted under 35 U.S.C. 154(b) by 350 days.

(21) Appl. No.: 13/719,726

(22) Filed: Dec. 19, 2012

(65) Prior Publication Data

US 2014/0067186 A1 Mar. 6, 2014

Related U.S. Application Data

(63) Continuation of application No. PCT/US2012/026998, filed on Feb. 28, 2012.

(60) Provisional application No. 61/532,086, filed on Sep. 7, 2011.

(51) Int. Cl.
| | |
|---|---|
| G05D 1/00 | (2006.01) |
| G01S 15/00 | (2006.01) |
| G01S 15/93 | (2006.01) |
| G01S 7/52 | (2006.01) |
| G01S 7/521 | (2006.01) |

(52) U.S. Cl.
CPC .............. G01S 15/003 (2013.01); G01S 15/931 (2013.01); G01S 7/52003 (2013.01); G01S 7/521 (2013.01)
USPC .................. 701/26; 701/23; 701/46; 701/301; 700/245; 700/258; 381/338; 381/339

(58) Field of Classification Search
CPC ........... A47L 11/4011; A47L 2201/00; G05D 1/0255

USPC ......... 700/245, 258; 701/23, 301, 46; 381/17, 381/337, 338, 339

See application file for complete search history.

(56) References Cited

U.S. PATENT DOCUMENTS

| | | |
|---|---|---|
| 3,743,973 A | 7/1973 | Jones |
| 6,173,233 B1 | 1/2001 | Janutka et al. |
| 6,389,329 B1 | 5/2002 | Colens |
| 6,532,404 B2 | 3/2003 | Colens |
| 6,594,844 B2 | 7/2003 | Jones |
| 6,690,134 B1 | 2/2004 | Jones et al. |

(Continued)

FOREIGN PATENT DOCUMENTS

WO    WO 2006083462 A2 * 8/2006

OTHER PUBLICATIONS

P.Muralt, "Micromachined Ultrasonic Transducers and Acoustic Sensor Based on Piezoelectric Thin Films", Electroceramic—Based MEMS Electronic Materials: Science and Technology vol. 9, 2005, pp. 37-48 file name: P Muralt.pdf.*

(Continued)

Primary Examiner — Tuan C. To
Assistant Examiner — Jelani Smith
(74) Attorney, Agent, or Firm — Honigman Miller Schwartz and Cohn LLP (57) ABSTRACT

A SONAR system for use with a robotic vacuum having SONAR emitters and receivers thereon. The SONAR system comprises a waveguide or horn located in front of the emitters and receivers that can improve the overall target resolution and reduce the number of "dead zones" where targets are not easily resolved.

16 Claims, 7 Drawing Sheets

(56) References Cited

U.S. PATENT DOCUMENTS

| | | |
|---|---|---|
| 6,781,338 B2 | 8/2004 | Jones et al. |
| 6,809,490 B2 | 10/2004 | Jones et al. |
| 6,965,209 B2 | 11/2005 | Jones et al. |
| 7,155,308 B2 | 12/2006 | Jones |
| 7,173,391 B2 | 2/2007 | Jones et al. |
| 7,196,487 B2 | 3/2007 | Jones et al. |
| 7,388,343 B2 | 6/2008 | Jones et al. |
| 7,389,156 B2 | 6/2008 | Ziegler et al. |
| 7,424,766 B2 | 9/2008 | Reindle et al. |
| 7,448,113 B2 | 11/2008 | Jones et al. |
| 7,571,511 B2 | 8/2009 | Jones et al. |
| 7,636,982 B2 | 12/2009 | Jones et al. |
| 7,761,954 B2 | 7/2010 | Ziegler et al. |
| 7,835,537 B2 | 11/2010 | Cheney |
| 2002/0016649 A1 | 2/2002 | Jones |
| 2002/0114218 A1* | 8/2002 | Lee et al. ............... 367/140 |
| 2002/0120364 A1 | 8/2002 | Colens |
| 2003/0025472 A1 | 2/2003 | Jones et al. |
| 2004/0020000 A1 | 2/2004 | Jones |
| 2004/0049877 A1 | 3/2004 | Jones et al. |
| 2004/0187457 A1 | 9/2004 | Colens |
| 2004/0207355 A1 | 10/2004 | Jones et al. |
| 2005/0067994 A1 | 3/2005 | Jones et al. |
| 2005/0204717 A1 | 9/2005 | Colens |
| 2005/0278888 A1* | 12/2005 | Reindle et al. ............ 15/319 |
| 2007/0086615 A1* | 4/2007 | Cheney ................... 381/338 |
| 2007/0266508 A1 | 11/2007 | Jones et al. |
| 2008/0140255 A1 | 6/2008 | Ziegler et al. |
| 2008/0155768 A1 | 7/2008 | Ziegler et al. |
| 2008/0184518 A1* | 8/2008 | Taylor et al. ............. 15/319 |
| 2008/0276407 A1* | 11/2008 | Schnittman et al. ....... 15/319 |
| 2008/0276408 A1* | 11/2008 | Gilbert et al. ............ 15/320 |
| 2008/0307590 A1 | 12/2008 | Jones et al. |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2012/0269037 A1* | 10/2012 | Morozov ................ 367/131 |

OTHER PUBLICATIONS

International Search Report for Application No. PCT/US2012/026998 dated May 10, 2012.

* cited by examiner

SONAR SYSTEM FOR REMOTE VEHICLE

CROSS REFERENCE TO RELATED APPLICATIONS

This U.S. patent application is a continuation of, and claims priority under 35 U.S.C. §120 and 365(c) from, PCT Patent Application PCT/US2011/026998, filed on Feb. 28, 2012, which claims priority under 35 U.S.C. §119(e) to U.S. Provisional Application 61/532,086, filed on Sep. 7, 2011. The disclosures of these prior applications are considered part of the disclosure of this application and are hereby incorporated by reference in their entireties.

TECHNICAL FIELD

This disclosure relates to relate to sonar systems for a remote, and more particularly, to sonar systems providing improved navigation for a remote vehicle such as a robotic vacuum.

BACKGROUND

Robots are useful in a variety of civilian, military, and law enforcement is applications. For instance, some robots may inspect or search buildings with structural damage caused by earthquakes, floods, or hurricanes, or inspect buildings or outdoor sites contaminated with radiation, biological agents such as viruses or bacteria, or chemical spills. Sonic robots carry appropriate sensor systems for inspection or search tasks. Robots designed for military applications may perform operations that are deemed too dangerous for soldiers. For instance, the robot can be used to leverage the effectiveness of a human "point man." Law enforcement applications include reconnaissance, surveillance, bomb disposal and security patrols.

SUMMARY

The present disclosure provides a SONAR system for use with a robotic vacuum having SONAR emitters and receivers thereon. The SONAR system includes a waveguide or horn provided for each of the emitters and receivers that can improve the overall target resolution and reduce the number of "dead zones" where targets are not easily resolved. A target, as used herein, can include any solid item within the remote vehicle's environment. A remote vehicle can use information regarding solid objects in its environment to, for example, avoid objects, follow walls, etc.

One aspect of the disclosure provides a SONAR system for use with a remote vehicle. The SONAR system includes at least one SONAR emitter having a waveguide tuned to guide emitted sound from the emitter into an environment of the remote vehicle and at least two SONAR receivers. Each SONAR receiver has a waveguide tuned to receive reflected sound from an environment of the remote vehicle. The waveguides of the emitter and the receivers are configured to improve the overall target resolution and reduce the number of "dead zones" where targets within the remote vehicles environment are not easily resolved.

At least one of the waveguides can be tuned by varying a curvature of its front and rear walls. At least one of the waveguides can be tuned by varying a curvature of its top and bottom walls. The emitter can have an emitter waveguide and the curvature of the rear wall of the emitter waveguide may not be the same as the curvature of the front wall of the emitter waveguide. The emitter can have an emitter waveguide and the curvature of the top wall of the emitter waveguide may not be the same as the curvature of the bottom wall of the emitter waveguide. At least one of the waveguides can be asymmetrical about its vertical axis. At least one of the waveguides can be asymmetrical about its horizontal axis. The waveguides can be configured to reduce near-field ground-plane reflections of signals emitted by the emitter to reduce a near-field Fresnel interference effect.

The SONAR system can include one or more of open-type PZT transducers, closed-type PZT transducers, mirror-bender PZT transducers, and piezoelectret film arrays arranged on a face of a bumper of the robotic vacuum.

The SONAR system emitter(s) can have an emitter waveguide having a mouth, and the SONAR system may further include diverters placed in a center of an exit of the mouth of the emitter waveguide to increase horizontal emission coverage.

The present disclosure also provides a SONAR system for use with a remote vehicle that includes at least two SONAR emitters. Each emitter has an emitter waveguide tuned to guide emitted sound from the emitter into an environment of the remote vehicle and at least two SONAR receivers. Each SONAR receiver has a receiver waveguide tuned to receive reflected sound from an environment of the remote vehicle. The emitter waveguides are located and configured aim sound toward a target in the remote vehicle environment from wide and varied angles.

The emitters can be located at outer edges of the remote vehicle. The emitter can be located non-centrally on the remote vehicle and the emitter waveguides and can be tuned to guide signals from the emitters forward to better cover an area into which the remote vehicle is moving, directing the emitted signals toward difficult targets in a path of the remote vehicle from the greatest oblique angle possible while still being mounted on the remote vehicle.

Another aspect of the disclosure provides a method for using a remote vehicle SONAR system to navigate a remote vehicle. The SONAR system includes a first side-mounted emitter, a second side-mounted emitter, a central emitter, a first receiver located between the first side-mounted emitter and the central emitter, and a second receiver located between the second side-mounted emitter and the central emitter. The method includes detecting obstacles by: emitting a signal from the first side-mounted emitter;

listening for a reflection of the signal from the first side-mounted emitter with the first receiver; firing the central emitter; listening for a reflection of the signal from the central emitter with the first receiver and the second receiver; firing the second side-mounted emitter; and listening for a reflection of the signal from the second side-mounted emitter with the second receiver.

The SONAR system may also include a third receiver located between the first side-mounted emitter and the central emitter, and a fourth receiver located between the second side-mounted emitter and the central emitter. The method may include following a wall by: emitting a signal from the first side-mounted emitter repetitively; listening for a reflection of the signal from the first side-mounted emitter with the first receiver and the third receiver after each signal is emitted from the first side-mounted emitter; using a differential between the signal received by the first receiver and the signal received by second receiver to determine whether the robotic vacuum is following the wall at a consistent spacing; and controlling the remote vehicle steering to maintain a consistent spacing from a wall using the differential between the signal received by the first receiver and the signal received by second receiver.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A typical sound navigation & ranging (SONAR) system has at least one transmitter and at least one receiver, possibly combined into a single transceiver element. A pulse train or other acoustic signal is sent out by an emitter, and at a later time a reflection from a target is detected by the receiver. Given the speed of sound in air, the distance to the target can be calculated as the distance covered during half of the time-of-flight between emission and detection.

Multipath interference is a major source of noise for synthetic aperture SONAR systems. A synthetic aperture SONAR system can utilizes an array of data taken at different times or at different vantage points to obtain robust information regarding an object. In multipath SONAR interference, the waveform recorded by the receiver is a convolved summation of the direct transmission path between transmitter and receiver, reflections off of targets, as well as sound that has arrived by other paths (target-floor-receiver, floor-target-receiver, floor-target-floor-receiver, target1-target2-receiver, and so on). The greater the number of targets that are in the field, the more complex the returned waveform can be, When a remote vehicle such as a robotic vacuum has a low height, and therefore has a SONAR system located proximate to the floor, multipath interference is prevalent and hard to avoid, even with highly directed transmitters.

When using a fixed broadcast frequency, there is an associated wavelength (for a 40 kHz fixed broadcast frequency, for example, the associated wavelength can be about 8 mm, although the exact wavelength varies slightly with temperature and humidity and the corresponding changes in speed of sound in air). As a device travels through the distance of a half-wavelength (e.g., 4 mm in the above 40 kHz scenario), due to multipath interference of returned information, the profile of the returned waveform changes over the course of the half-wavelength. This is due to changes in a phase relationship of the different components of a signal reflection echo. The returned, aggregate waveforms, as measured at half-wavelength spacing multiples (i.e., at 4 mm, 8 mm, N*4 mm), resemble each other somewhat closely. Although there is typically a polarity flip from one half-wavelength interval to the next half-wavelength interval, the polarity flip affects all received reflection components so that the overall shape of successive waveform amplitude curves at half-wavelength intervals are similar. There can, however, be drastic changes in the aggregate waveform profile over the span of traveling through a single half-wavelength. When viewed as a full, ongoing sequence, the received waveform will "flicker" with the periodicity of the broadcast frequency half-wavelength. Flicker can include a variation in the returned echo amplitude within a specific time bin. In some examples, SONAR systems are arranged and tuned to minimize flicker and other drastic changes in aggregate waveform.

Between any transmitter and receiver pair, there are specific distances at which targets are more difficult to resolve. The distances can be periodically spaced, in that if it is difficult to resolve a target at a distance of 100 mm from the center point of a transceiver pair, it will likely also be difficult to resolve the target at nulls of 50 mm and 200 mm as well. Conversely, the signal strength and target resolution of a transmitter and receiver pair is particularly strong at the spaced anti-nodes or peaks in reception strength (e.g., if it is difficult to resolve a target at a distance of 100 mm from the center point of the transceiver pair, then resolution will be particularly strong at peaks of 150 mm and 75 mm). The spacing of these peaks in reception strength and nulls in reception strength can be modified by changing the spacing between a SONAR transmitter and its associated receiver, the distance of transmitter and receiver pairs from the ground-plane, or the broadcast frequency of transmitter and receiver pairs.

The distance of peak/null spacing is proportional to broadcast frequency, and inversely proportional to spacing of the transmitter from the receiver. In describing this relationship mathematically, the concept of Fresnel Interference Zones (mostly used in RF signal transmission) applies, in that a transmission line between an emitting antenna and destination receiver has concentric ellipses around it where any obstacles within a given ellipsis would create either in-phase (constructive, in odd-order Zones) or out-of-phase destructive, in even-order Zones) reflection components. Since the piezoceramic devices are mounted so close to the ground relative to the length of the signal path, the corresponding Fresnel Interference Zones intersect the ground-plane and form concentric ellipses of zones emanating from the center-point of the transmitter/receiver pair where the contribution of ground-plane reflections alternate, in the aggregate, as being constructive or destructive. The effect of ground-plane reflection is exacerbated when the ground-plane is highly reflective (e.g., on a hard floor). An absorptive ground-plane (e.g., carpet) mitigates, but does not eliminate, the effect.

The distance between an emitter and a receiver placed on a remote vehicle such as a robotic vacuum can be chosen to take advantage of the Fresnel Interference Zone effect. In free air with no reflections (all targets in the far-field and no ground-plane), the direct transmission signal level between the emitter and receiver falls off somewhat regularly with the square of the distance between the emitter and the receiver, unless the emitter or receiver has odd off-axis side lobes which would alter this behavior. When a ground-plane is introduced (e.g., when the remote vehicle is placed on the floor), at some distances between emitter and receiver (depending, as stated above, on (1) height from the floor, (2) broadcast frequency, and (3) wave speed), the ground-plane reflections as an aggregate are constructive at certain distances and are destructive at some distances. It therefore can be advantageous to space the emitter and receiver such that they are in even-ordered Fresnel Zones on a forward-facing surface of the remote vehicle (e.g., on a front surface of a robotic vacuum bumper), on that the aggregate ground-plane reflections are destructive. Destructive ground-plane reflections minimize the inherent transmitter-to-receiver signal strength in amplitude and in time domain, and tend to improve the resolution of near-field targets. With proper spacing, a direct transmission signal between an emitter and a receiver of a SONAR pair can be reduced by up to 6 dB. The destructive effect is strongest on a hard (i.e., reflective ground-plane. A more absorptive ground-plane can reduce destructive interference, such that a direct transmission signal received is greater on a damped floor, being close to that of the free air condition.

In certain embodiments of the present teachings, this ground-plane reflection effect can be utilized to determine a floor type. When proper spacing exists between a transmitter and a receiver, a reduction in direct transmission signal beyond a determined threshold indicates that the floor surface immediately in front of the devices is hard. A signal level closer to that of the free-air condition indicates that the floor is either soft (e.g., carpet) or not there (a cliff). The present teachings also contemplate that the emitter and receiver spacing could alternatively be chosen in the converse; by spacing the emitter and receiver within odd Fresnel Interference Zones, a hard surface would increase the direct signal received above that of the free-air level, and a soft surface would reduce the direct signal back to that of the free-air transmission.

Robotic systems exist that utilize a SONAR system, and that fire pulses at a fixed periodic rate (e.g., with about a 50 mS spacing between pulse trains, or 20 firings per second). A fixed firing period may be simple to implement, but it can be beneficial to adjust this period in order to take advantage of the periodic flicker, to get multiple wavelength profiles within a given half wavelength. As a remote vehicle moves through a space, it can be advantageous to take measurements at as many phases within a half-wavelength as possible in order to capture one with the best resolution. In the case of a complex environment (e.g., when there are multiple closely spaced targets), multiple closely-spaced measurements taken over the path of a single half-wavelength can advantageously reveal that at some positions the reflected energy highly blurs the targets, whereas at some positions the targets can be clearly and distinctly resolved.

If the remote vehicle is in such an environment and captures a waveform that more clearly shows distinct target peaks, it can be advantageous to time further firings to receive them at half-wavelength multiples of the original reception location to maximize the integrity of the signal, i.e., to coordinate the firing period with the velocity of the robotic vacuum. Conversely, if the remote vehicle is traveling at certain fixed velocities such as 3 inches per second, all of the firings and received signals might occur at the same relative phase within the half-wavelength, such that targets might remain blurred.

There could also be the situation where sequentially-sampled waveforms are highly uncorrelated, making threshold detection difficult and inconsistent from sample to sample. If the timing of the firings is coordinated with the velocity of the robotic vacuum, the periodic flicker can be minimized or at least exploited for improved target resolution.

The present teachings contemplate providing a remote vehicle SONAR system having a minimized cost and complexity and having good coverage to detect a variety of targets consistently. The present teachings contemplate providing a properly-configured waveguide (also referred to as a horn), extending outwardly from SONAR emitters and receivers to direct signals away from emitters and toward receivers, the waveguide improving the overall target resolution and reducing the number of "dead zones" where targets are not easily resolved. Waveguides can be utilized in a SONAR system for navigation of a robotic vacuum system, providing wide horizontal and controlled vertical coverage as appropriate for a robotic vacuum. Given the aspect ratio of typical robotic vacuums, a waveguide can reduce near-field ground-plane reflections to reduce Fresnel interference effect in the near-field, at the expense of possibly exacerbating the effect at larger distances still within the desired target detection range. Optimal SONAR system coverage can be obtained, however, via judicious placement of SONAR transmitters and receivers on the robotic vacuum such that for any given target location in the desired detection field, there is a transmitter-receiver pair that has that target location placed within an odd (constructive, in-phase) Fresnel Interference Zone. In general, a greater number of emitting and receiving devices used in the SONAR system can provide a greater overlapping coverage, such that Fresnel Interference dead zones are reduced.

Electroacoustic ultrasonic transducers: In accordance with various embodiments of the present teachings, several different types of transducers may be utilized for an ultrasonic SONAR system. Below is a partial listing of transducer devices that are contemplated for use in accordance with the present teachings:

Open-Type PZT: A lead crystal, piezoceramic bimorph is mounted within a small open housing (e.g., 10 mm in diameter, although larger designs are available). To augment output, the bimorph is coupled to an aluminum cone radiator, which resonates in a minimally damped way, similar to a paper whizzer as used in automotive loudspeakers. The radiating assembly is covered by an integral metal or plastic mesh. An open-type PZT transducer is relatively low cost, is available from multiple suppliers, and is a high-Q factor transducer, being highly efficient/sensitive at resonance while naturally rejecting out-of-band signals (i.e., this transducer is somewhat immune to environmental noise). However, an open-type PET transducer is maximally exposed to dirt and debris that can cause signal attenuation, with even a small amount of gummy, dampening material in contact with the radiator reducing the output from the device by at least 10 dB. Such maximally exposed devices may pose a problem for safety certification, depending on the strength and design of the protective mesh covering the devices. The high-Q nature of open-type PZT transducers causes the transducers to ring in time, blurring the signal received and obscuring targets. Also, open-type PZT transducers cannot easily be used outside of narrow frequency band of operation. Lastly, many open-type PZT transducers contain lead, which may be prohibited for use in robotic vacuums.

Closed-type PZT: A lead crystal, piezoceramic bimorph is mounted to the underside of an aluminum housing (typically 14 mm in diameter or larger). The housing is tuned (typically through micro-machining) so that the resonance of the system is adjusted to a specific frequency. A closed-type PZT transducer is better protected from debris than open-type design, can be cleaned without a risk of damage, and can have an asymmetric internal structure, such that it has inherently different radiation patterns along opposing axes, allowing for more controlled radiation of sound without the need for a directive horn. However, a closed-type PZT transducer has reduced efficiency/sensitivity compared with open-type devices (about 15 dB on average), and generally costs more than an open-type PZT transducer. Many closed-type PZT transducers contain lead, which may be prohibited for use in robotic vacuums.

Piezoelectret Films: Polymers that are dipolar (e.g., PVDF) have been shown to have piezoelectric-like properties, albeit with tow efficiencies compared to PZT devices. Polymer sheets have been fabricated that have small, flattened voids that can be exposed to dielectric barrier discharge such that the Paschen breakdown caused by the coronal discharge results in charges remaining on the surfaces of the internal voids. When exposed to a varying electric field, the surfaces within the voids attract and are repelled, generating an acoustic signal. Piezoelectret films are low-Q factor, and therefore can be used in a broad frequency range (allowing for use of coded transmissions) and are generally much faster in response time than piezoceramics (providing for more detailed resolution of targets). A shape of the piezoelectret film is conformable, such that shape of the device can be optimized for a given application. Films are also thin (e.g., about 1 mm or less for a full sensor assembly), allowing for easy integration with minimal volume occupied by fill array. Most piezoelectret films are lead-free. However, piezoelectret film transmitters can be relatively high impedance, such that they require higher driving voltages to operate (and therefore more complex electronics design and a higher associated cost). Piezoelectret film receivers are relatively low in sensitivity, requiring low-noise preamplifiers to provide useful signal levels, an that electronics may need to be located close to the file to minimize EMI. In addition the broadband nature of piezoelectret films makes them more likely to pick up extraneous environmental noise, such that bandpass filters may be required. Further, the technology is still being developed, with limited suppliers for some kinds of film.

In accordance with various alternative embodiments of the present teachings, transducers such as moving coil "supertweeters" and electrostatic modules such as the Polaroid/Senscomp device can also be employed.

The present teachings contemplate a variety of ways in which a SONAR system can be configured on a robotic vacuum, each of which has various associated merits and drawbacks. Certain embodiments of the present teachings contemplate locating the SONAR system on a front surface of the remote vehicle and, in the case of a robotic vacuum, on a curved, moveable surface similar to or including existing robotic vacuum front bumper designs.

Flush Mounted Open-Type PZT Transducers: In accordance with certain embodiments of the present teachings, open-type piezoceramic devices are mounted such that their faces are flush against the front bumper of the robotic vacuum. Aside from the general advantages of open-type devices (e.g., low cost, multiple suppliers, high efficiency/sensitivity), in this type of assembly, the relatively smooth, curved surface of robotic vacuum can provide a good baffle because it is fairly smooth and non-complex, with minimal obstacles generating diffraction and thus creating noise. This assembly can also provide a minimal added depth to the robotic vacuum front bumper. Open-type PZT transducers mounted low on the robotic vacuum, properly placed, can take maximum advantage of the four device-spacing criteria mentioned above to maximize cancellation of direct path transmission. However, flush mounting open-type PZT transducers direct more energy directly upward and downward, possibly exacerbating "false target" readings for surfaces and materials above the robotic vacuum. In addition, transducers that are mounted close to the ground are maximally exposed to dirt and debris that can cause signal attenuation, Even a small amount of gummy, dampening material can reduce the output from the device by over 10 dB. Maximally exposed transducers pose a problem for safety certification, depending on the strength and design of the protective mesh covering the devices Horn-Mounted Open-Type PZT Devices: In accordance with certain embodiments of the present teachings, open-faced piezoceramic devices are mounted onto waveguides that are integrally molded into the plastic of the robotic vacuum's front bumper. Aside from the general advantages of open-type devices (e.g., low cost, multiple suppliers, high efficiency/sensitivity), in this type of assembly, the directive nature of properly designed waveguides improves coverage (e.g., wider horizontal and narrower vertical radiated beam direct sound more directly into an area into which the robotic vacuum is moving). Effective waveguides, however, can add additional depth to the bumper, complicating its design. In addition, wave guides typically reduce efficiency/sensitivity of devices due to a reduced aperture into which the device is mounted. Waveguides can reduce but do not eliminate the chance of debris obstruction and, depending on throat geometry, accessibility for product safety certification might remain a concern.

Flush Mounted Closed-Type PZT Transducers: In accordance with certain embodiments of the present teachings, closed piezoceramic devices (e.g., a ProWave 400EP14D) can be mounted flush to a thee of the robotic vacuum front bumper. In such an embodiment, the transducers are more protected and less exposed to damage than open-type PZT transducers. Transducers can be oriented to have broad horizontal and controlled vertical coverage (specific to certain asymmetric models, such as the ProWave 400EP14D). However, flush mounted closed-type PZT transducers can have a higher cost than open-type PZT transducers. Lower efficiency/sensitivity requires the use of more closed-type transducers to achieve the full coverage of open-type transducers.

Rear Mounted Mirror-Bender PZT Transducers: In accordance with certain embodiments of the present teachings, open-type PZT devices are available configured in housings that have an angled, L-shaped exit aperture. One such device, e.g., a ProWave part 500MB120, comes as a transmitter-receiver pair. Transducers can be mounted such that radiating piezoceramics are pointing downward, with an exit aperture positioned outward/forward. Rear mounted mirror-bender PZT transducers can provide the efficiency/sensitivity of open-type transducer. Recessing transducers into L-shaped waveguides, as well as mounting the transducers to be downward firing, can offer improved protection from debris. Such an exemplary system can be designed such that the transducers are mounted into a robotic vacuum body, with flared waveguides designed into bumper and coupled to the transducers. Coupling can employ one of a sliding mechanism and a collapsing mechanism to preserve signal path to and from transceivers even when the bumper is retracted into robotic vacuum body. Such a design would eliminate need for the transducers (or associated electronics and cabling) to be mounted directly to front bumper. However, rear mounted minor-bender PZT transducers can be more costly than standard open-type PZT transducers, and a limited variety of rear mounted mirror-bender PZT transducers are currently available from vendors, although this mounting arrangement could be constructed from standard open-type PZT devices.

Piezoelectret Film Arrays: In accordance with certain embodiments of the present teachings, multiple, conformable strips of piezoelectret (e.g., PVDF or an expanded and charged polypropylene from Emfit) can be arranged on the face of the robotic vacuum bumper. Advantageously, if the strips are appreciably longer than they are wide, they will act as line radiators, with wide horizontal and narrow vertical coverage. In addition, piezoelectret film arrays are natural transceivers (i.e., they can both send and receive) and can be configured, using appropriate delays, as a steered array. Piezoelectret film arrays are low Q devices that allow for use of broadband signal transmission (which allows coded transmissions) and are generally much faster in response time than piezoceramics, providing for better temporal resolution of targets. However, piezoelectret film arrays can have higher electronics costs to drive their high impedance and capacitive transmitters, and can require a preamplifier to boost and resolve the low signal levels from receivers. Further, accessibility for safety certification and protection of devices from contact damage would have to be considered prior to productization, although flexibility and configurability of films allows for mounting schemes such as recessing the film array into the bumper, allowing for some protection from contact.

In accordance with certain embodiments of the present teachings, a SONAR system could be configured using a combination of the above elements.

In embodiments of the present teachings utilizing open-type PZT devices with signal direction and concentration created with use of a waveguide, several different types of waveguides can be utilized. One challenge is that the output of the PZT devices in the near field can be somewhat chaotic and uncollimated. This near-field area is known as the Fresnel Zone, not to be confused with the Fresnel Interference Zone as described above. The far-field equivalent where the emanating wave propagates normally and more coherently from the transducer is known as the Fraunhofer Zone. Because the initial radiation into the waveguide is in this Fresnel Zone, some waveguide types (e.g., compound waveguide, where the aperture reduces initially in one axis before re-expansion) will not work as intended, for example when reflection components within the waveguide throat cause nulls at some radiating angles and therefore poor uniformity of coverage.

Figure 1:
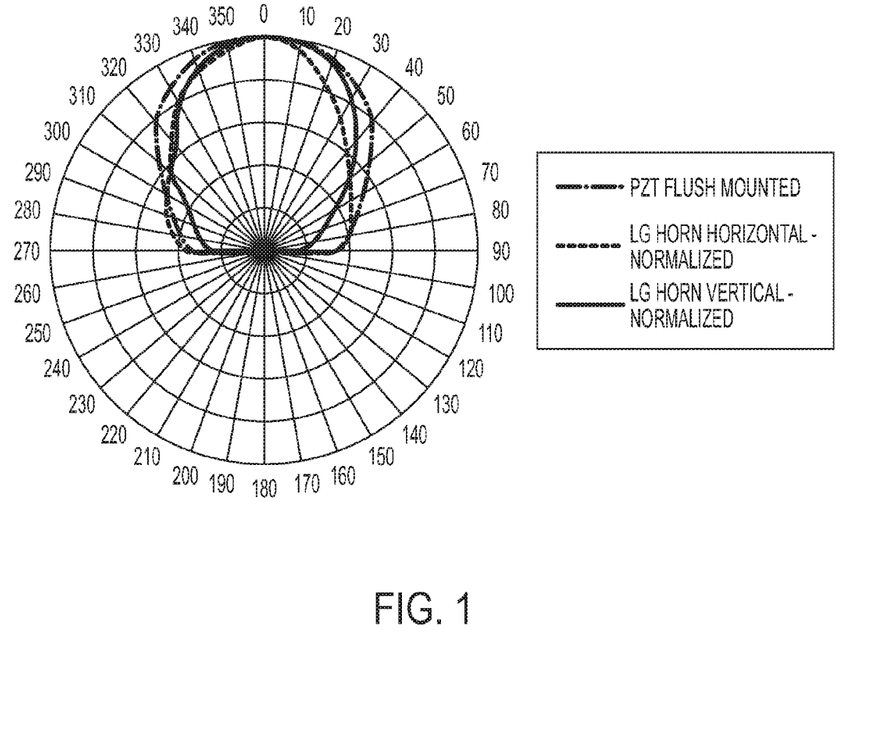
FIG. 1 provides a normalized comparison of measured transducer output for known SONAR systems, and showing that known waveguides fail to adequately direct an emitted signal.

Existing robotic vacuums utilizing SONAR have five piezoceramic devices (e.g., two emitters and three receivers) mounted to simple, symmetrical waveguides. The geometry of each of the waveguides for the emitters and the receivers are identical, and include, for example, a 10 mm diameter waveguide that is mounted flush to a plate that has a vertically oriented, oval slot (e.g., 1.4 mm wide and 2.8 mm high) having a straight flare to its opening (e.g., a 2.4 mm wide and 4.8 mm high exit, with continued flare to seamlessly meet the curved front baffle). Existing waveguides do not sufficiently control and direct a radiation pattern of the transducers. FIG. 1 provides a normalized comparison of measured transmitter output for existing SONAR systems. As can be seen, the overall shape of the radiation pattern is similar. The primary advantage offered by the waveguide is a slight reduction in off-axis (>70°) output in the vertical plane. Therefore, an oval waveguide may not significantly affect the radiation pattern of the SONAR emitter.

For SONAR transmitters, the initial aperture into which the emitter fires greatly determines the overall radiation pattern of the emitter, much in the same way that a diffraction slot would determines the overall radiation pattern. The vertical orientation of existing remote vehicle SONAR emitter oval slots provides for a behavior similar to a vertical line radiator, for example creating a more controlled vertical dispersion and a somewhat broader horizontal dispersion. The small area of existing remote vehicle SONAR emitter oval slots (e.g., 1.4 mm by 2.8 mm) compared to the overall area of the radiating device (e.g., a 10 mm diameter) attenuates the overall output signal proportionally. It would be advantageous to keep an overall vertical aperture profile for better vertical control, while maximizing the size of the slot to avoid attenuating the device output unnecessarily.

In accordance with certain embodiments of the present teachings, a rectangular vertical slot for a SONAR transmitter (e.g., approximately 8.2 mm tall by 3.2 mm wide) can provide significant off-axis vertical attenuation. To further direct the emanating wave, flared side walls can be used. The flare of the side walls can, for example, start out perpendicular to the face of the device, and continue the expansion in a nearly hyperbolic way. If the flare expansion rate of the walls to the sides is greater than that of the walls above and below the device, a rectangular waveguide mouth (in the present embodiment being wider than tall) can provide wider horizontal coverage and narrower vertical coverage. A SONAR system design in accordance with the present teachings minimizes flash or other sharp edges or protrusions in or near the waveguide, because such flash or sharp edges can cause sound waves to diffract and re-radiate from such obstacles, acting like a new, delayed source, thereby exacerbating multipath interference.

Figure 2:
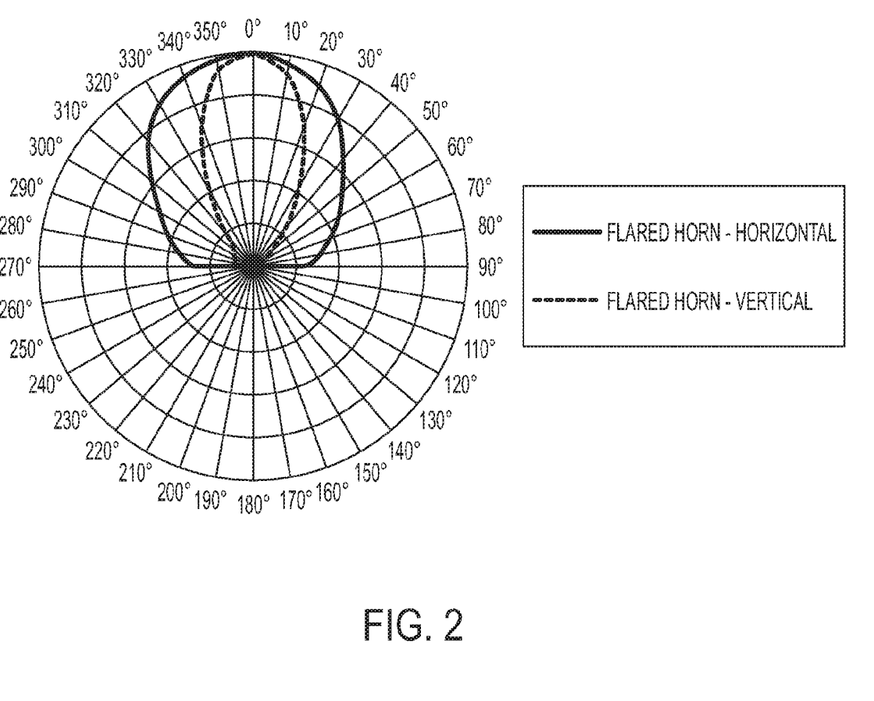
FIG. 2 illustrates an exemplary graph measuring SONAR emitter output when an exemplary flared waveguide of a SONAR system is positioned vertically and horizontally, and showing that the waveguide indeed directs an emitted signal.

In an exemplary embodiment of the present teachings, a waveguide has a mouth height of 17 mm, a mouth width of 38 mm, and mouth depth of 15 mm. Data for measured emitter output for such an exemplary embodiment is shown in FIG. 2. One skilled in the art will appreciate that the waveguide parameters can be adjusted somewhat if necessary without significantly affecting the overall shape of the radiation pattern.

The emitter output graph of FIG. 2 shows a narrower, controlled vertical beam achieved through use of a waveguide in accordance with the present teachings, showing that a waveguide can indeed direct an emitted SONAR signal. It is possible to narrow this beam even further, although it would take additional waveguide depth to achieve this goal without creating off-axis lobes. Such a waveguide depth increase can complicate the SONAR system design, particularly in embodiments that incorporate the SONAR system into a front bumper of a robotic vacuum. For horizontal coverage, the flared waveguide design above can provide for only slightly wider coverage than a free-air/flush-mounted device.

The present teachings contemplate using optional diverters placed in the center of the waveguide mouth exit to achieve even wider horizontal coverage, at the expense of off-axis nulls in the coverage generated. The greater the diameter of the diverters, the wider the horizontal coverage achieved, but also the deeper the nulls in the horizontal polar response.

Regarding targets, in the real world, there are many types of objects and surfaces that a SONAR system might encounter, with varied reflectivity and associated target reflection "profiles." Generally, a harder and flatter object will create a stronger reflection of emitted signals. In addition, and object having an orientation that is parallel to a face of the SONAR transceiver will create a stronger reflection. In some cases, small obstacles with some of these features can present themselves as strong targets. A low-edge surface, such as the side of a slightly raised floor tile, if approached perpendicularly by a remote vehicle, can return a very strong reflection; if approached askew, however, the reflection might be minimal. Similarly, a square dowel, such as a table or chair leg, when oriented parallel to the faces of the SONAR system transmitters and receivers, returns a strong reflection, but an angled edge of a square dowel faces the devices, almost all of the reflected signal is redirected as scatter, with very little or no reflection returned to the receiver. An angled edge may therefore not be sensed by a SONAR system and thus may not be identified by the remote vehicle as a target. One challenge for a SONAR system is how to adequately illuminate such difficult targets.

To better detect and resolve difficult targets such as angled table/chair legs as described above, the present teachings contemplate using parallax, aiming sound toward the target from wide and varied angles. Parallax is an apparent displacement or difference in the apparent position of an object viewed along two different lines of sight, and is measured by the angle or semi-angle of inclination between those two lines. SONAR elements mounted at the outer edges of the SONAR system (e.g., at the outer edges of a robotic vacuum bumper) can assist in providing such varied angles. For SONAR system elements located at the back edge of the SONAR system (e.g., at the back edge of a robotic vacuum bumper), it can be advantageous to have the transceiver mounted so that it projects its ultrasonic output forward rather than outward to better cover the area into which the robotic vacuum is moving, directing sound toward difficult targets in the remote vehicle's path from the greatest oblique angle possible while still being contained within the remote vehicle. Mounting the SONAR transmitter within a waveguide that is aimed generally forward allows for some amount of protection for the transmitter, while directing the emitted sound more toward the desired area of coverage, although smoothness of coverage can be compromised due to reflections within the waveguide throat that can occur from reflections in an off-axis throat.

Figure 3:
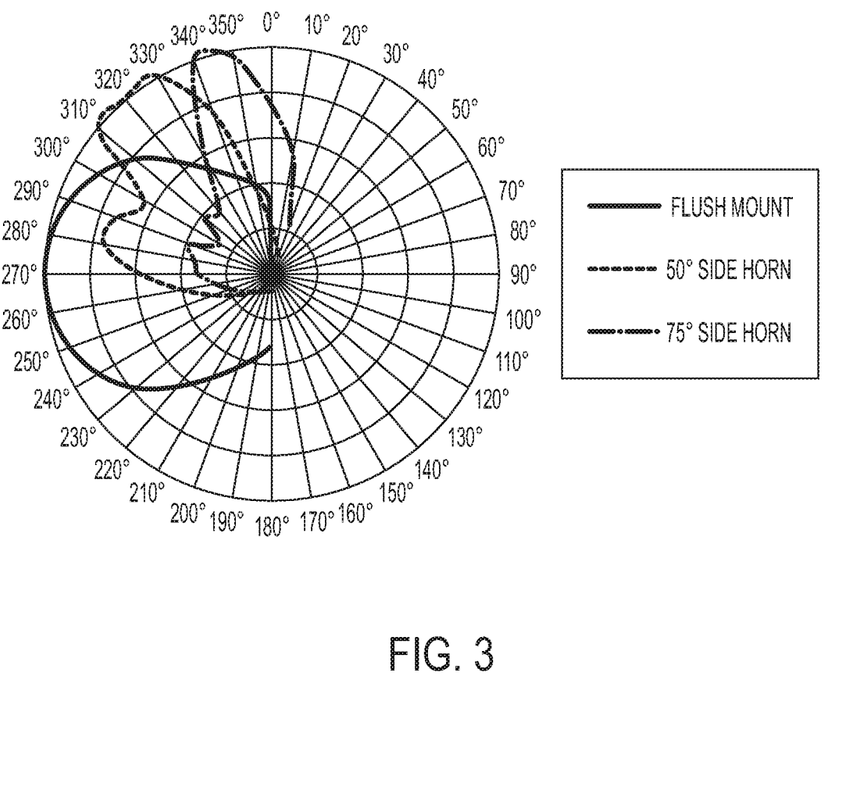
FIG. 3 illustrates an exemplary graph measuring SONAR emitter output when a waveguide of a side-mounted emitter of a SONAR system is flush mounted, is configured to direct an emitted signal 50° forward, and is configured to direct an emitted signal 75° forward.
Figure 4:
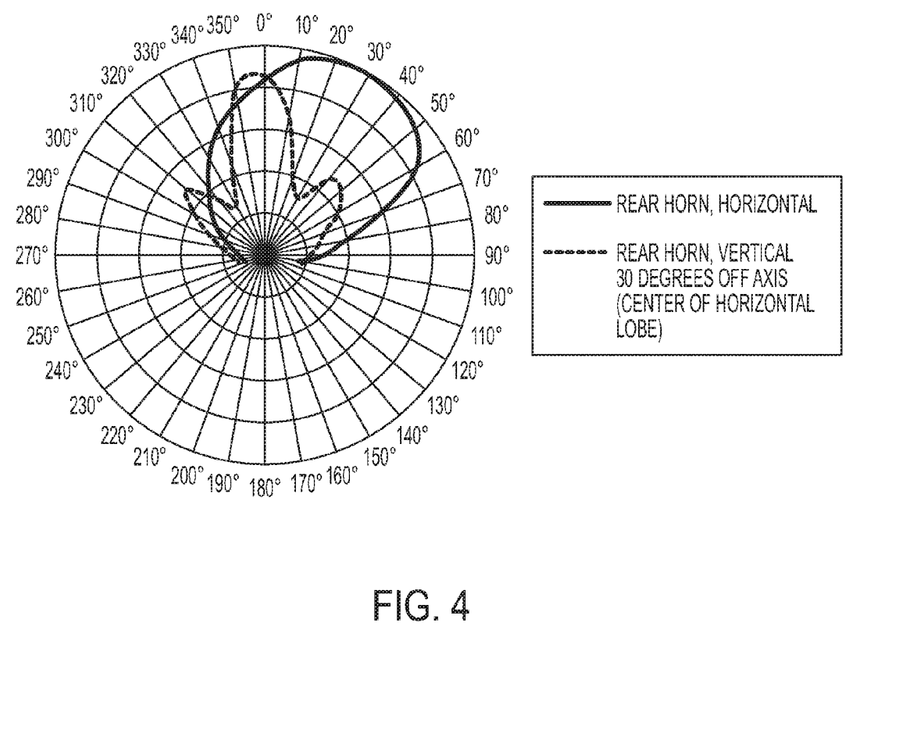
FIG. 4 illustrates an exemplary graph measuring SONAR emitter output when an asymmetrical waveguide of a SONAR system is configured to direct an emitted signal 50° forward. The graph depicts a horizontal output and a vertical output.

FIG. 3 illustrates measured SONAR emitter output when an asymmetric waveguide is used on a side of a robotic vacuum bumper, having circular apertures into which the device is mounted, so that the emitter's vertical coverage beam is still somewhat large. As can be seen, the flush mount provides a wide beam extending from the side of the robotic vacuum bumper. The 50° asymmetric side horn provides a more directed beam aimed toward a front of the robotic vacuum (e.g., from about 310° to about 330° with a small finger at about 285°). The 75° asymmetric side horn provides an even more directed beam aimed farther toward a front of the robotic vacuum (e.g., from about 340° to about 350°). Elements of the waveguide's design can be configured to achieve further beam control. For example, in an exemplary embodiment, a waveguide can have a vertical slot loading (i.e., creating a vertical slot in the aperture used to connect the transmitter to the waveguide) and controlled vertical flare of the flared waveguide design, with an asymmetric horizontal flare of the side portions of the waveguide, which can provide a controlled yet wide horizontal coverage aimed approximately 30° forward, with tight vertical control (albeit with some vertical side lobes) as shown in the measured emitter output graph of FIG. 4.

Based on their ability to direct sound toward an area into which the remote vehicle is moving, asymmetric horns can provide improved SONAR sensing remote vehicles.

Based on the above teachings, if the goal is simply to determine the distance to the nearest obstacle, then a configuration of open-type PZT devices, some of which are horn-loaded, can be a preferred option. At least five emitters and receivers can be utilized, although seven (or more) devices can provide more thorough coverage, with minimal "dead zones" due to targets being in destructive Fresnel Interference Zones. If a mapping system is desired, however, where the position of multiple targets needs to be more precisely resolved, an embodiment can be utilized that includes an array scheme such as one using piezoelectret films.

Figure 5:
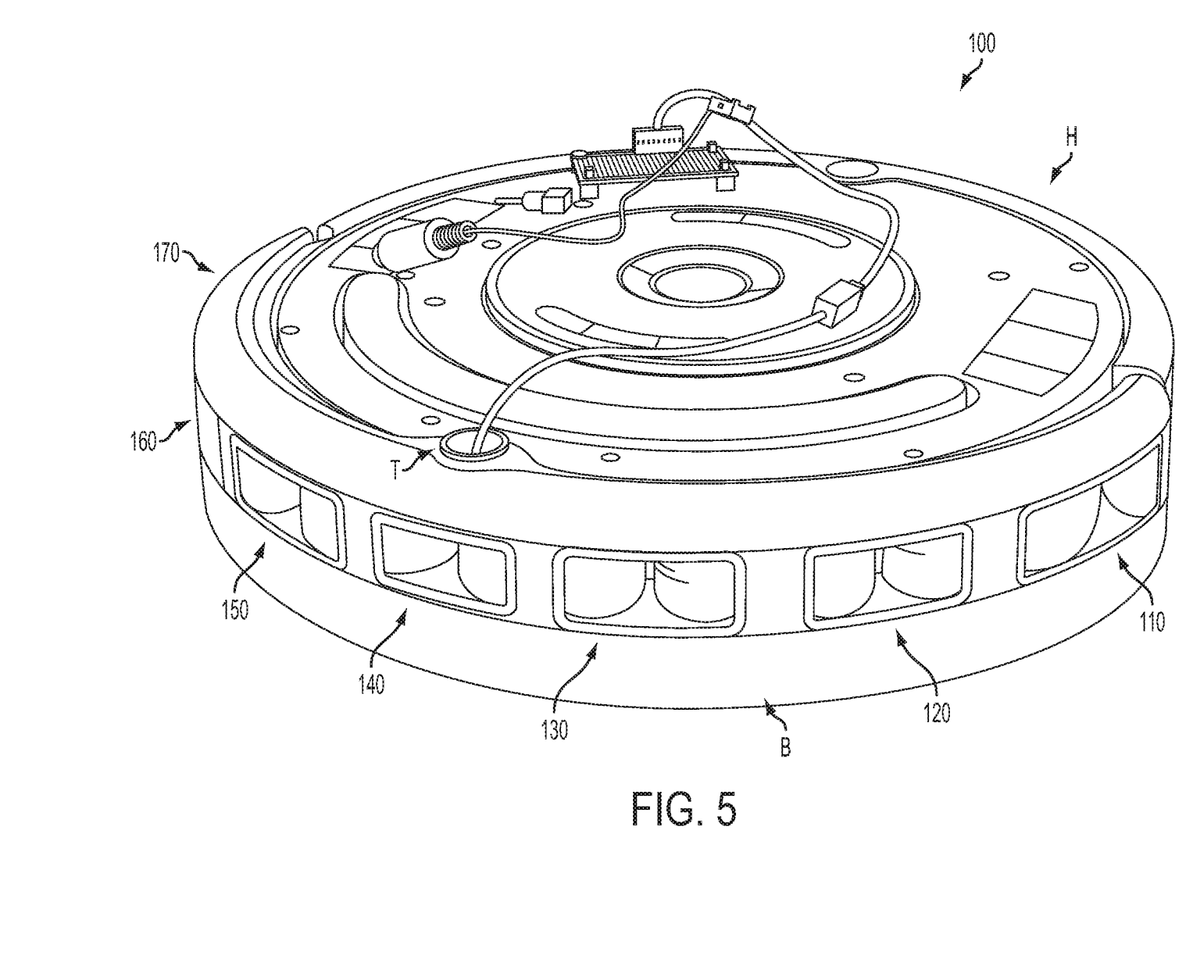
FIG. 5 is a perspective view of an exemplary embodiment of a robotic vacuum having a SONAR system in accordance with the present teachings.

FIG. 5 is a perspective view of an exemplary embodiment of a robotic vacuum having a SONAR system in accordance with the present teachings. As shown, a robotic vacuum 100 includes a housing H having a plurality of SONAR elements (e.g., SONAR emitters and SONAR receivers) located along about a front half thereof. In the illustrated embodiment, the SONAR elements include an emitter 110, a receiver 120, a receiver 130, an emitter 140 which is centrally located among the SONAR elements, a receiver 150, a receiver 160 (not fully visible in FIG. 5), and an emitter 170 (not visible in FIG. 5). The present teachings contemplate using more or less than the seven depicted SONAR elements, and a variety of arrangements of emitters and receivers.

In various embodiments of the present teachings, each emitter includes an emission element such as, for example, an ultrasonic emitter, and arcuate watts creating a waveguide extending from the emission element to an outer surface of the robotic vacuum. The arcuate walls direct the ultrasonic emission to a specified area of the robotic vacuum's environment. In various embodiments, each receiver includes a receiver element such as, for example, an ultrasonic sensor, and arcuate walls creating a waveguide extending from the receiver element to an outer surface of the robotic vacuum. The arcuate walls direct incoming waves from the robotic vacuum's environment toward the receiver element. More detail about the emitters and receivers is shown and discussed below with respect to FIGS. 7 to 9.

In the illustrated embodiment of FIG. 5, the waveguides of rearmost emitters 110 and 170 (rearmost emitter 170 is not shown but can be a mirror image of rearmost emitter 110) are asymmetrical, allowing them to direct emitter sound adequately to illuminate difficult targets in a relevant environment of the robotic vacuum 100, because sound from emitters 110, 140, and 170 will be aimed from varied angles toward difficult targets in the relevant environment of the robotic vacuum 100. Asymmetric waveguides can be referred to as "steering horns" because they can provide a robotic vacuum with improved steering within a typical environment.

In certain embodiments of the present teachings, only the rearmost emitters 110, 170 of the SONAR system have asymmetrical waveguides. In other embodiments including more than the three emitters 110, 140, 170 of FIG. 5, the additional non-central emitters can have asymmetrical waveguides to achieve a desirably broad and accurate SONAR coverage of a relevant environment of the robotic vacuum 100.

In various embodiments of the present teachings, at least one receiver of the SONAR system can have an asymmetrical waveguide, which can allow the receiver to block undesirable noise such as a direct emission from a nearby emitter, and to better direct sound along to a central receiving sensor.

In the illustrated embodiment of FIG. 5, the emitters and receivers are located on a bumper B of a round robotic vacuum, although the present teachings contemplate using the SONAR system on robotic vacuums that do not have bumpers and that are not rounded, and thus the emitters and receivers are located on a front of the housing and optionally at least partially along sides of the housing.

Figure 6:
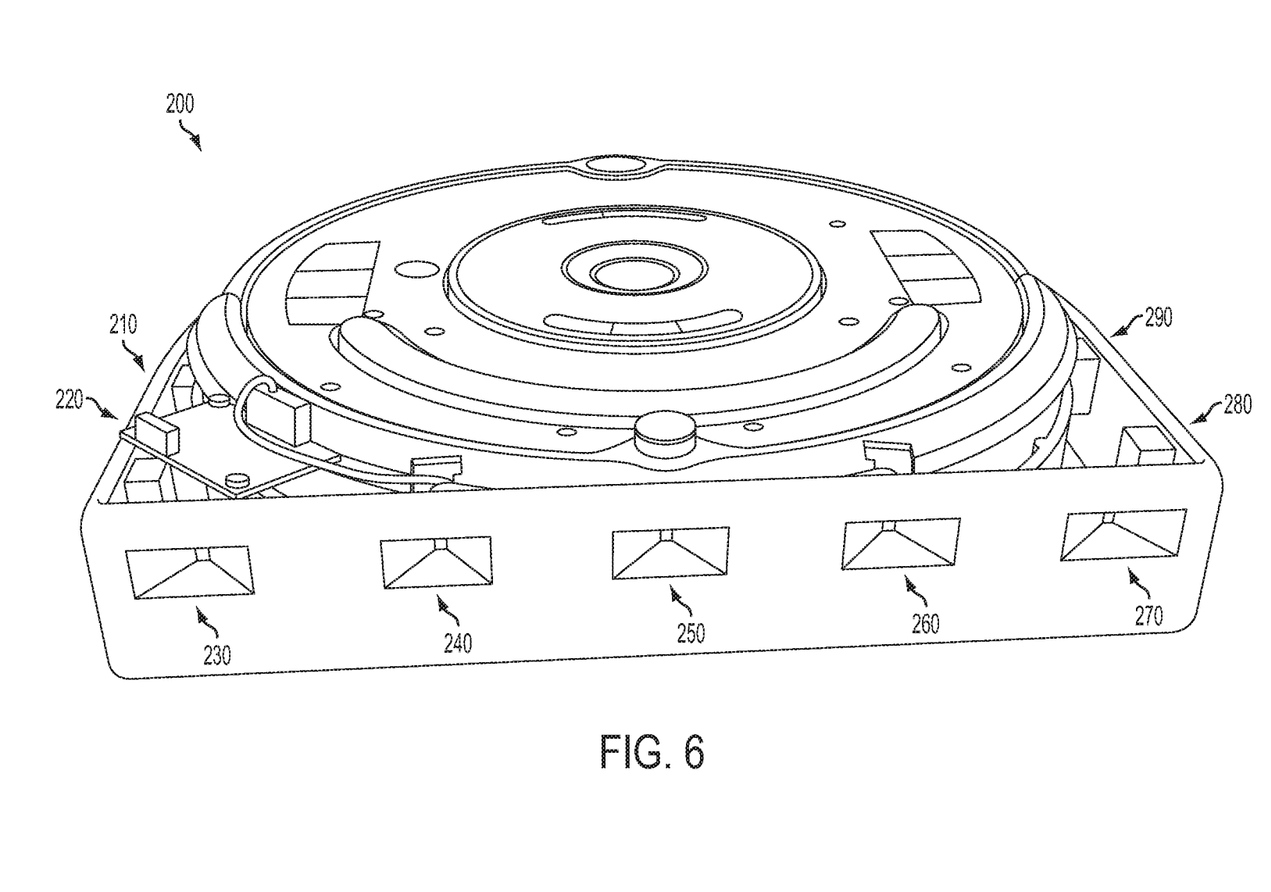
FIG. 6 is a perspective view of another exemplary embodiment of a robotic vacuum having a SONAR system in accordance with the present teachings.

FIG. 6 illustrates a robotic vacuum 200 including another exemplary embodiment of a SONAR system in accordance with the present teachings, The robotic vacuum 200 has a squared front rather than the rounded front illustrated in the embodiment of FIG. 5. As shown, the robotic vacuum 200 includes a housing having a plurality of SONAR elements (e.g., SONAR emitters and SONAR receivers) located along a front surface thereof and at least partially along sides there thereof. In the illustrated embodiment, the SONAR elements include a receiver 210 (not visible), an emitter 220 (only visible from the rear), a receiver 230, an emitter 240, a receiver 250 which is centrally located among the SONAR elements, an emitter 260, a receiver 270, emitter 280 (only visible from the rear), and a receiver 290 (only visible from the rear). The present teachings contemplate using more or less than the nine depicted SONAR elements, and a variety of arrangements of emitters and receivers.

In various embodiments of the present teachings, each emitter includes an emission element such as, for example, an ultrasonic emitter, and a waveguide including arcuate walls extending from the emission element to an outer surface of the robotic vacuum, The arcuate walls direct the ultrasonic emission to a specified relevant area of the robotic vacuum's environment. In various embodiments, each receiver includes a receiver element such as, for example, an ultrasonic sensor, and a waveguide including arcuate watts extending from the receiver element to an outer surface of the robotic vacuum. The arcuate walls direct incoming waves from the robotic vacuum's environment toward the receiver element. More detail about the emitters and receivers is shown and discussed below with respect to FIGS. 7 to 9.

In the illustrated embodiment of FIG. 6, none of the emitters 220, 240, 260, 280 or receivers 210, 230, 250, 270, 290 are asymmetrical. However, the present teachings contemplate utilizing asymmetrical emitters to direct emitter sound more adequately, for example to illuminate difficult targets and provide desirably broad and accurate SONAR coverage. Asymmetrical emitters and receivers may be desirable to obtain sufficient coverage when there is limited space for emitters and receivers, and/or to diminish/remove SONAR blind spots such as, for example, any blind spots that may exist due to the squared front corners of the robotic vacuum housing illustrated in FIG. 6. The present teachings contemplate employing the SONAR system on robotic vacuums having a variety of housing shapes and sizes, and employing the SONAR system on side and/or rear surfaces of robotic vacuums that require object detection to the side and/or to the rear (e.g., if the robotic vacuum can move to the side and/or to the rear and therefore should avoid obstacles to its side and/or to its rear). The shape of the waveguides for the emitters and receivers can be optimized to provide suitable detection of obstacles (targets) in the remote vehicle's relevant environment.

In various embodiments of the present teachings, certain of the receivers can also be asymmetrical, which can allow the receiver to both block undesirable noise such as a direct emission from a nearby emitter, and to better direct sound along to a central receiving sensor. The emitters 220, 240, 260, 280 and receivers 210, 230, 250, 270, 290 are preferably located on the robotic vacuum housing, which additionally houses various known elements of a robotic vacuum such as its controller, motor(s), vacuum impeller, brush(es), wheels, and dust/dirt bin.

Figure 7:
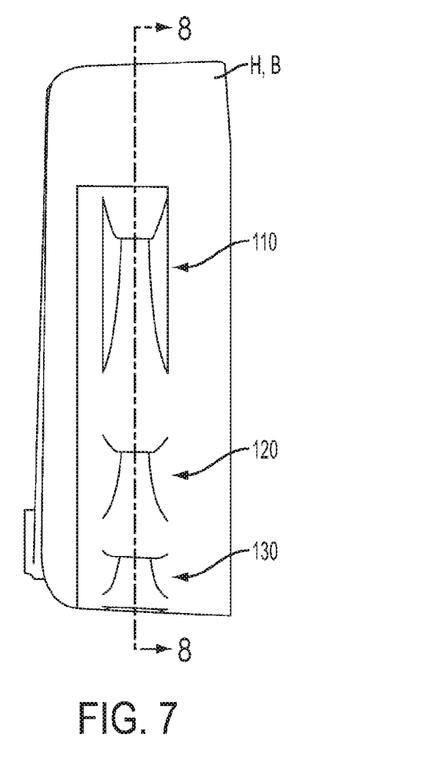
FIG. 7 is a partial side view of the robotic vacuum SONAR system of FIG. 1

FIG. 7 is a partial side view of a robotic vacuum housing H (for the embodiment of FIG. 5, the bumper B) including an exemplary embodiment of a SONAR system in accordance with the present teachings, such as the embodiment of FIG. 5. The emitter 110 and receivers 120, 130 are shown. The asymmetry of emitter 110 can be seen in this partial side view.

Figure 8:
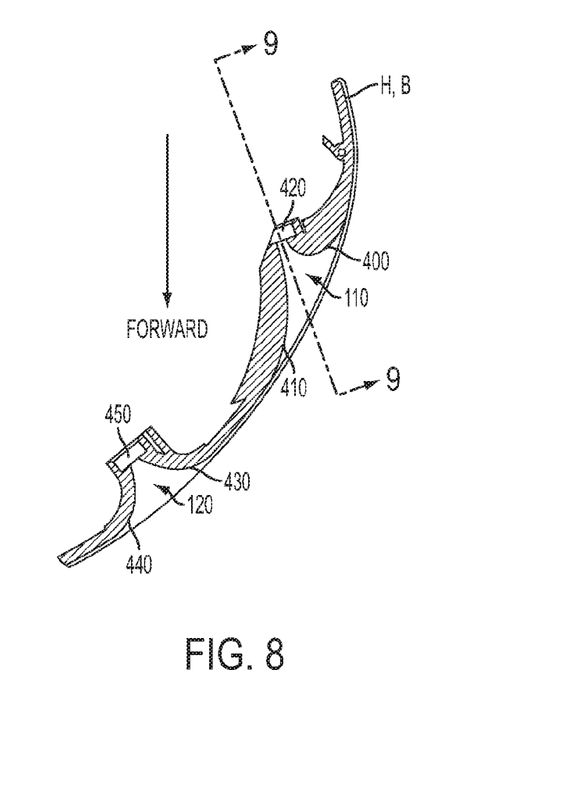
FIG. 8 is a cross-sectional view of the partial view of the robotic vacuum SONAR system of FIG. 7, taken along line 8-8 of FIG. 7.

FIG. 8 is a partial cross sectional view taken along line 8-8 of FIG. 7, showing two SONAR elements. The emitter 110 and receiver 120 are shown in cross section. The asymmetry of emitter 110 can be seen in this cross sectional view. The emitter 110 includes a rearward wall 400 having a greater curvature than a forward wall 410 thereof. The rearward wall 400 and forward wall 410 extend into the housing H or bumper portion B of the housing H to an emitter element 420. The depth that the rearward wall 400 and forward wall 410 extend into the housing H or bumper portion B of the housing H, and the curvature of the rearward wall 400 and forward wall 410 can determine the direction and shape of the emitted SONAR signal from emitter element 420. The adjacent receiver 120 includes a rearward wall 430 having substantially the same curvature as a forward wall 440 thereof The rearward wall 430 and forward wall 440 extend into the housing H or bumper portion B of the housing H to a receiver element 450. The depth that the rearward wall 430 and forward wall 440 extend into the housing H or bumper portion B of the housing H, and the curvature of the rearward wall 430 and forward wall 440 can determine the direction from which signals will be received.

Receiver 120 will likely receive a SONAR signal directly from emitter 110, and may additionally receive an echo from an object in the path of the SONAR emission from emitter 110.

Figure 9:
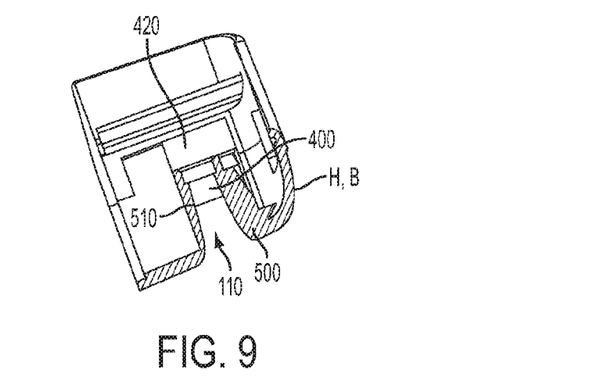
FIG. 9 is a cross-sectional view of the partial view of the robotic vacuum SONAR system of FIG. 8, taken along line 9-9 of FIG. 8.

FIG. 9 is a partial cross sectional view taken along line 9-9 of FIG. 8, showing SONAR emitter 110 in cross section. The emitter view includes rearward wall .400 and emitter element 420. In addition, a top wall 500 and an opposing bottom wall 510 of the emitter 110 are shown. As stated above with respect to walls 400 and 410, the depth and curvature of the walls 500, 510 can determine the direction and shape of the emitted SONAR signal from emitter element 420. Indeed, the depth and shape of bottom wall 510 can determine the amount of noise caused by emitted SONAR signals contacting and reflecting from the floor over which the robotic vacuum is traversing. While walls 400,410,500,510 of emitter 110 are referred to herein, the present teachings contemplate the emitters and receivers herein comprising contiguous surfaces of continuous curvature such that one continuous surface is provided and the start and end of individual walls may not occur or be apparent. In certain embodiments, the remaining emitters and receivers have a shape that is similar to or substantially the same as the shape of receiver 120. "Emitter," as used with respect to FIGS. 7 to 9, includes the emitter element and the associated waveguide, "Receiver," as used with respect to FIGS. 7 to 9, includes the sensor element and the associated waveguide.

Robotic vacuums found in the prior art employing SONAR with ellipsoid horns can have significant multipath interference from a surface over which the robotic vacuum travels. A robotic vacuum having SONAR emitters and receivers as described herein can minimize multipath interference from the surface over which the robotic vacuum travels. Minimization can be achieved, at least in part, by flaring one or more waveguides of the SONAR system to have a greater flare in its side walls (e.g., the rearward wall and forward wall) than in its top wall and bottom wall. The greater flare of the side walls (e.g., the rearward wall and forward wall) of the waveguides of the SONAR system can provide a greater object detection spread in the near field, and therefore improved triangulation and overlap in the near field.

Regarding filtration of direct SONAR emissions received by the SONAR sensors (as opposed to emissions reflected by targets), embodiments of the present teachings contemplate filtration occurring by utilizing a threshold that incorporates both time and intensity, the value and duration of the threshold being based on experimental results for a given robotic vacuum design. As stated above, the direct transmission signal level between the emitter and receiver falls off somewhat regularly with the square of the distance between them. During the predetermine duration of time, only a level of SONAR signal intensity received above the threshold is considered to be indicative of an obstacle. Thus, the emissions received by a direct path are filtered out by a limited duration threshold. By optimizing or varying the waveguide shape, the present teachings can improve SONAR system reliability for a given remote vehicle configuration.

The present teachings contemplate using an odd number of emitters and an even number of shared receivers. For a robotic vacuum employing a SONAR system such as the embodiment shown in FIG. 5, a SONAR system emission/receipt scheme such as the following can be employed: (1) Emitter 110 fires and receivers 120 and 130 listen; then (2) emitter 140 fires and receivers 130 and 150 listen (or emitters 120, 130, 150,160 listen); then (3) emitter 170 fires and receivers 150, 160 listen. This exemplary pattern can be repeated by the SONAR system to detect obstacles in a relevant environment of the robotic vacuum.

In addition to detecting obstacles for the purpose of Obstacle avoidance, a SONAR system can be utilized, for example, to provide sensor data for a wall-following behavior. For wall following, emitter 110 can emit and receivers 120 and 130 can receive, repetitively. The differential between the signal received by receiver 120 and the signal received by receiver 130 can be used to determine whether the robotic vacuum is following the wall at a consistent spacing, and also to control the robotic vacuum steering to maintain a consistent spacing from the wall. To perform obstacle detection (and avoidance) during wall following, emitter 140 can also fire and receivers 130 and 150 can listen (or emitters 120,130,150,160 can listen). For enhanced obstacle detection (and avoidance) during wall following, emitter 170 can additionally fire and receivers 150, 160 can listen.

Various embodiments of the present teachings contemplate tilting one of the emitters and or receivers of the SONAR system, or at least a top wall of a waveguide thereof, upward to sense wedging hazards (e.g., low overhanging objects), and/or tilting one of the emitters and or receivers of the SONAR system, or at least a bottom wall of a waveguide thereof, downward to assist in determining a floor type as described above. The present teachings contemplate an exemplary embodiment wherein a receiver or at least a top wall of a receiver (e.g., receiver 150 in FIG. 5) is tilted slightly upward and another receiver or at least a bottom wall another receiver (e.g., receiver 160 in FIG. 5) is tilted slightly downward. Such a receiver arrangement would facilitate both detection of wedging hazards and detection of a floor type. Knowing a floor type could be useful, for example, for keeping a remote vehicle such as a robotic floor washer from transitioning into a carpeted area. Because robotic floor washers should avoid both carpeted areas and cliffs, both of which absorb emitted SONAR signals, the present teachings contemplate using a SONAR system as both a carpet sensor and a cliff sensor to enhance navigation of a robotic floor washer.

For embodiments of the present teachings having a SONAR emitter and/or receiver pointed upward, the present teachings contemplate using the information regarding an overhanging object to determine that the robotic vacuum is under a table or couch and therefore may encounter chair legs and or more debris in certain areas. Indeed, recognition of a table or couch may trigger an appropriate behavior (e.g., cleaning behavior) of the robotic vacuum specific to the furniture type that is recognized.

For robotic vacuums that can back up (i.e., move in a reverse direction), a SONAR system can be employed at a rear of the robotic vacuum to provide information for obstacle avoidance and cliff detection.

A SONAR system can share space at a front of the robotic vacuum with a camera. Data from the camera can be employed, for example, for ranging or to provide video surveillance. Data from the camera can be integrated with data from a SONAR system of the present teachings, for example to enhance data used for Obstacle detection and navigation.

A robotic vacuum equipped with a SONAR system in accordance with the present teachings, which cleans via "cornrows" rather than randomized coverage, can utilize the SONAR system to avoid an obstacle and get back into its cornrow by maintaining a knowledge of where the robotic vacuum is relative to the obstacle as the obstacle passes along the emitters of the SONAR system, allowing the robotic vacuum to curve around an obstacle and regain its position within a corn row.

Certain embodiments may weight firing of emitters based on where the system, which comprises a controller, "thinks" an obstacle is.

A number of implementations have been described. Nevertheless, it will be understood that various modifications may be made without departing from the spirit and scope of the disclosure. Accordingly, other implementations are within the scope of the following claims.

What is claimed is:

1. A SONAR system for use with a remote vehicle, the SONAR system comprising:
    at least one SONAR emitter having a waveguide tuned to guide emitted sound from the emitter into an environment of the remote vehicle; and
    at least two SONAR receivers, each SONAR receiver having a waveguide tuned to receive reflected sound from an environment of the remote vehicle,
    wherein each of the waveguides of the emitter and the receivers includes a front wall, a rear wall, a top wall, and a bottom wall, and at least one of the waveguides is tuned by varying a curvature of its front and rear walls and/or its top and bottom walls.

2. The SONAR system of claim 1, wherein the curvature of the rear wall of the emitter waveguide is not the same as the curvature of the front wall of the emitter waveguide.

3. The SONAR system of claim 1, wherein the curvature of the top wall of the emitter waveguide is not the same as the curvature of the bottom wall of the emitter waveguide.

4. The SONAR system of claim 1, wherein at least one of the waveguides is asymmetrical about its vertical axis.

5. The SONAR system of claim 1, wherein at least one of the waveguides is asymmetrical about its horizontal axis.

6. The SONAR system of claim 1, wherein the waveguides are configured to reduce near-field ground-plane reflections of signals emitted by the emitter to reduce a near-field Fresnel interference effect.

7. The SONAR system of claim 1, further comprising open-type PZT transducers.

8. The SONAR system of claim 1, further comprising closed-type PZT transducers.

9. The SONAR system of claim 1, further comprising mirror-bender PZT transducers.

10. The SONAR system of claim 1, further comprising piezoelectric film arrays arranged on a face of a bumper of the robotic vacuum.

11. The SONAR system of claim 1, wherein the emitter waveguide includes a mouth, and the system further comprises diverters placed in a center of an exit of the mouth of the emitter waveguide.

12. A SONAR system for use with a remote vehicle, the SONAR system comprising:
   at least two SONAR emitters, each emitter having an emitter waveguide tuned to guide emitted sound from the emitter into an environment of the remote vehicle; and
   at least two SONAR receivers, each SONAR receiver having a receiver waveguide tuned to receive reflected sound from an environment of the remote vehicle,
   wherein the emitter waveguides are located and configured aim sound toward a target in the remote vehicle environment, each waveguide comprising a front wall, a rear wall, a top wall, and a bottom wall, at least one of the waveguides tuned by varying a curvature of its front and rear walls and/or its top and bottom walls.

13. The SONAR system of claim 12, wherein the emitters are located at outer edges of the remote vehicle.

14. The SONAR system of claim 12, wherein the emitter is located non-centrally on the remote vehicle and the emitter waveguides are tuned to guide signals from the emitters forward to better cover an area into which the remote vehicle is moving, directing the emitted signals toward difficult targets in a path of the remote vehicle from the greatest oblique angle possible while still being mounted on the remote vehicle.

15. A method for using a remote vehicle SONAR system to navigate a remote vehicle, the SONAR system comprising a first side-mounted emitter, a second side-mounted emitter, a central emitter, a first receiver located between the first side-mounted emitter and the central emitter, and a second receiver located between the second side-mounted emitter and the central emitter, the method comprising detecting obstacles by:
   emitting a signal from the first side-mounted emitter;
   listening for a reflection of the signal from the first side-mounted emitter with the first receiver;
   firing the central emitter;
   listening for a reflection of the signal from the central emitter with the first receiver and the second receiver;
   firing the second side-mounted emitter; and
   listening for a reflection of the signal from the second side-mounted emitter with the second receiver;
   wherein each of the first side-mounted emitter, the second side-mounted emitter, and the central emitter have a waveguide tuned to guide emitted signals from their respective emitter into the environment of the remote vehicle, each of the first and second receivers having a waveguide tuned to receive reflected signals from the environment of the remote vehicle, and each waveguide comprising a front wall, a rear wall, a top wall, and a bottom wall, at least one of the waveguides tuned by varying a curvature of its front and rear walls and/or its top and bottom walls.

16. The method of claim 15, wherein the SONAR system further comprises a third receiver located between the first side-mounted emitter and the central emitter, and a fourth receiver located between the second side-mounted emitter and the central emitter, the method further comprising following a wall by:
   emitting a signal from the first side-mounted emitter repetitively;
   listening for a reflection of the signal from the first side-mounted emitter with the first receiver and the third receiver after each signal is emitted from the first side-mounted emitter;
   using a differential between the signal received by the first receiver and the signal received by second receiver to determine whether the robotic vacuum is following the wall at a consistent spacing; and
   controlling the remote vehicle steering to maintain a consistent spacing from a wall using the differential between the signal received by the first receiver and the signal received by second receiver.

* * * * *